(12) United States Patent
Fujiyama

(10) Patent No.: US 10,061,291 B2
(45) Date of Patent: Aug. 28, 2018

(54) NUMERICAL CONTROL DEVICE INSPECTING SCREW HOLES

(71) Applicant: FANUC Corporation, Minamitsuru-gun, Yamanashi (JP)

(72) Inventor: Jirou Fujiyama, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 296 days.

(21) Appl. No.: 15/063,540

(22) Filed: Mar. 8, 2016

(65) Prior Publication Data

US 2016/0274576 A1    Sep. 22, 2016

(30) Foreign Application Priority Data

Mar. 18, 2015  (JP) .................................. 2015-54374

(51) Int. Cl.
G05B 19/401    (2006.01)

(52) U.S. Cl.
CPC .. G05B 19/401 (2013.01); *G05B 2219/37441* (2013.01); *G05B 2219/49196* (2013.01)

(58) Field of Classification Search
CPC ............................. G05B 19/401; B25J 13/085
See application file for complete search history.

(56) References Cited

U.S. PATENT DOCUMENTS

2007/0002315 A1    1/2007    Ban et al.

FOREIGN PATENT DOCUMENTS

| JP | H02-224934 A | 9/1990 |
|---|---|---|
| JP | H04-134002 U | 12/1992 |
| JP | H05-92349 A | 4/1993 |
| JP | H05-053847 U | 7/1993 |
| JP | H07-113604 A | 5/1995 |
| JP | H09-38845 A | 2/1997 |
| JP | H09-62335 A | 3/1997 |
| JP | 2003-181722 A | 7/2003 |
| JP | 2007-010620 A | 1/2007 |
| JP | 2008-164349 A | 7/2008 |
| JP | 2008-261801 A | 10/2008 |
| JP | 5582436 B2 | 9/2014 |

OTHER PUBLICATIONS

Notification of Reasons for Refusal dated Apr. 4, 2017 in Japanese Patent Application No. 2015-054374 (4 pages) with an English translation (4 pages).

*Primary Examiner* — Thomas L Dickey
(74) *Attorney, Agent, or Firm* — Drinker Biddle & Reath LLP

(57) ABSTRACT

A numerical control device of the present invention includes a control unit that controls a machining tool including a main axis having a screw-hole inspection gauge attached thereto in such a way that a feed-axis motor and a main-axis motor for the main axis perform operations for screw-hole inspection based on a machining program and a determining unit that determines acceptance/defect of inspection of a screw hole machined on a workpiece based on a condition of the feed-axis motor or the main-axis motor during control by the control unit.

12 Claims, 6 Drawing Sheets

ACCEPTABLE

DEFECTIVE

ACCEPTABLE

DEFECTIVE

FIG. 4A

MEASUREMENT OF MAIN-AXIS TORQUE CUMULATION OF ACCEPTED PRODUCT AND SETTING OF ALLOWABLE RANGE

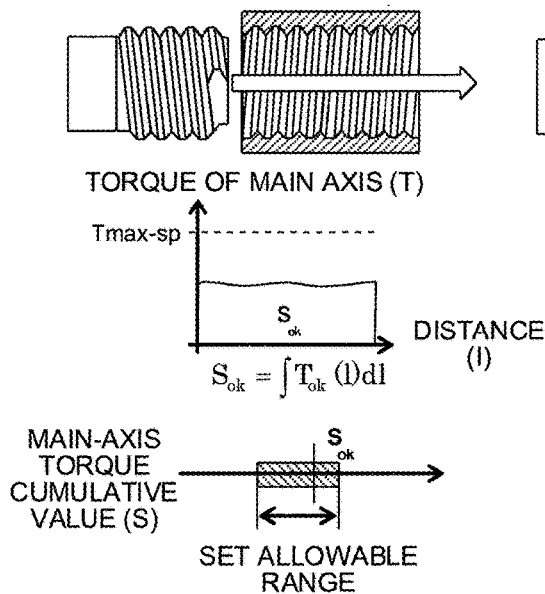

FIG. 4B

AT INSPECTION, DETERMINATION IS PERFORMED BY COMPARING MAIN-AXIS TORQUE CUMULATIVE VALUE WITH THAT OF ACCEPTED PRODUCT

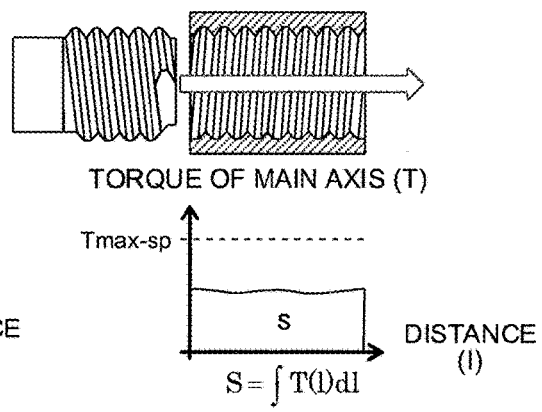

WHEN S IS WITHIN ALLOWABLE RANGE: ACCEPTABLE

WHEN S IS OUTSIDE ALLOWABLE RANGE: DEFECTIVE

FIG. 5A

WHEN TORQUE OF MAIN AXIS IS HIGHER THAN $T_{high}$

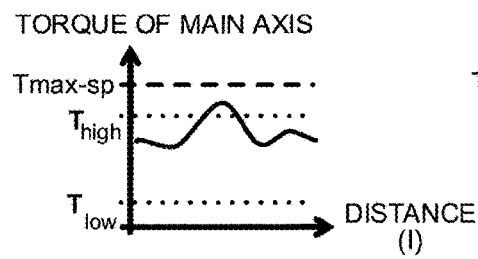

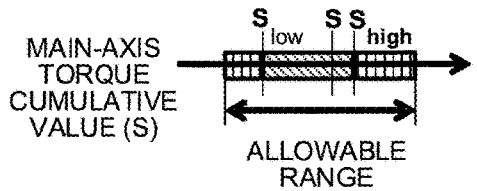

FIG. 5B

WHEN WARNING IS NOT GIVEN TO TORQUE OF MAIN AXIS BUT TORQUE OF MAIN AXIS IS HIGHER THAN $S_{high}$

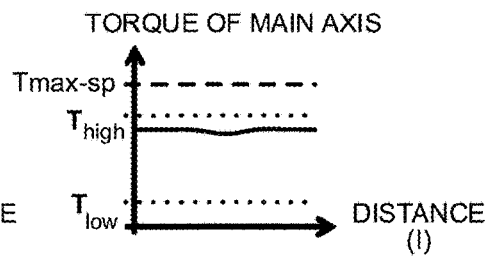

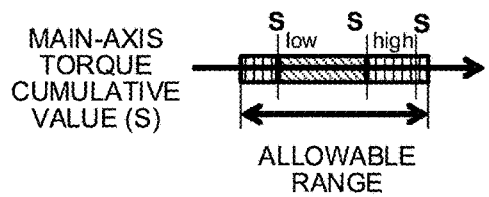

FLOATING BY HARDWARE CONFIGURATION
(EXISTING METHOD)

FIG. 7

COMPARISON OF CONTROL OPERATIONS IN ACTUAL MACHINING AND IN SCREW-HOLE INSPECTION MODE

| MACHINING PROGRAM | ACTUAL MACHINING | INSPECTION |
|---|---|---|
| O0001 | START | START |
| M06 T01 | SELECT TOOL FOR ROUGH MACHINING | |
| : | ROUGH MACHINING | SKIP BLOCKS UNTIL REGISTERED TOOL FOR TAP MACHINING IS SELECTED |
| M06 T02 | SELECT TOOL FOR PREPARATIVE HOLE MACHINING | |
| : | PREPARATIVE HOLE MACHINING | |
| M06 T03 | SELECT TOOL FOR CHAMFERING MACHINING | |
| : | CHAMFERING MACHINING | |
| M06 T04 | TOOL FOR TAP MACHINING | |
| | SELECT T4 | SELECT INSPECTION TOOL T14 CORRESPONDING TO T4 |
| G00 | POSITIONING | POSITIONING |
| G84 | TAP MACHINING CYCLE | INSPECTION OPERATION CYCLE |
| X_Y_ | | |
| X_Y_ | | |
| G80 | CYCLE IS COMPLETED | INSPECTION IS COMPLETED |
| G00 | POSITIONING | POSITIONING |
| : | | |
| M30 | END | END |

SHIFT TO SCREW-HOLE INSPECTION MODE THAT USES MAIN-AXIS TORQUE CUMULATION BY SIGNAL BEFORE EXECUTION OF PROGRAM

SET ASSOCIATION BETWEEN MACHINING TOOL AND INSPECTION TOOLS

| MACHINING | LOAD | GO | NO GO |
|---|---|---|---|
| T4 | T14 | T15 | T16 |

SELECT INSPECTION TOOL T14 CORRESPONDING TO T4

LOAD: TOOL FOR MAIN-AXIS TORQUE CUMULATION DETERMINATION

GO: TOOL FOR GO SIDE DETERMINATION

NO GO: TOOL FOR NO GO SIDE DETERMINATION

FIG. 8A

CHANGE OF SCREW-HOLE
INSPECTION MODE BY G CODE

| O0100 | O0100 |
| --- | --- |
| Gxx | G CODE FOR CHANGE OF SCREW-HOLE INSPECTION MODE |
| M98 P0001 | CALL O0001 |

FIG. 8B

SCREW-HOLE INSPECTION
OPERATION BY G CODE

| O0002 | |
| --- | --- |
| M06 T14 | TOOL FOR SCREW-HOLE INSPECTION |
| G00 | G CODE FOR SCREW-HOLE INSPECTION INSTRUCTION |
| Gyy | |
| X_ Y_ | INSPECTION IS COMPLETED |
| G80 | |

INSPECTION OPERATION IS PERFORMED FOR EACH POSITIONING FROM Gyy TO G80

FIG. 9A

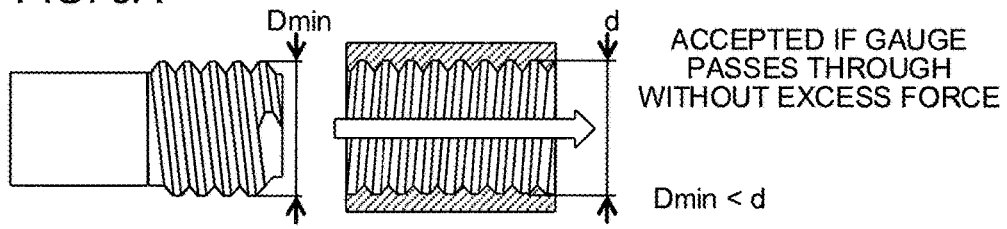

ACCEPTED IF GAUGE PASSES THROUGH WITHOUT EXCESS FORCE

Dmin < d

FIG. 9B

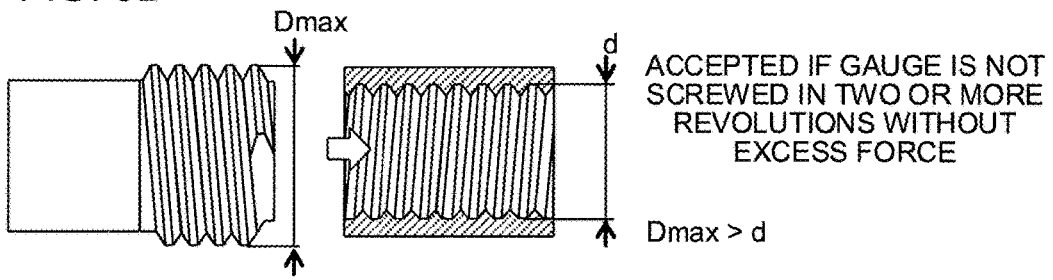

ACCEPTED IF GAUGE IS NOT SCREWED IN TWO OR MORE REVOLUTIONS WITHOUT EXCESS FORCE

Dmax > d

NUMERICAL CONTROL DEVICE INSPECTING SCREW HOLES

BACKGROUND OF THE INVENTION

Field of the Invention

The present invention relates to a numerical control device, and more particularly to a numerical control device that can perform automatic inspection of a screw hole with a machine that has machined the screw hole without preparing special dedicated hardware.

Description of the Related Art

Inspection of effective diameters of screw holes (female screws) is generally performed manually with an inspection device called a screw limit gauge. There are two types of gauges, i.e., a Go gauge and a No Go gauge. If a Go gauge is screwed in and passed through the whole length of a screw by hand without difficulty (FIG. 9A) and a No Go gauge is screwed in and not screwed in more than two revolutions by hand without difficulty (FIG. 9B), the screw hole is determined to be acceptable in the inspection. This inspection is defined by JIS standard (JIS B0251).

For automatic inspection of screw holes, there has been a technique of monitoring the torque of a motor having a gauge attached thereto (for example, Japanese Patent Laid-Open No. 2008-261801 and Japanese Patent Laid-Open No. 04-134002). A threshold value is set for the torque. If a Go gauge inserted into a screw hole is passed therethrough without the torque exceeding the threshold value and a No Go gauge reaches the threshold value before the No Go gauge is rotated a predetermined number of revolutions, the screw hole is determined to be acceptable.

Examples of the automatic inspection method also include a noncontact inspection method by an eddy-current flaw detecting device or images (for example, Japanese Patent Publication No. 5582436 and Japanese Patent Laid-Open No. 2007-010620).

As a method for inserting a male screw into a female screw without collapse of a thread, there has been a method in which a male screw that is attached to a motor having a floating mechanism is reversely rotated to match the phase of the thread (for example, Japanese Patent Laid-Open No. 02-224934).

However, conventional techniques have problems described below.

First, an automatic inspection device using a screw limit gauge, which is disclosed in Japanese Patent Laid-Open No. 2008-261801, Japanese Patent Laid-Open No. 04-134002, and the like, is a precision device that requires high accuracy. Accordingly, the automatic inspection device is expensive, thereby causing a problem with respect to cost.

In automatic inspection by torque, only acceptance/defect is determined and a technique for preventing a defect before the defect occurs is not taken into consideration. A main cause of defects of screw holes is the abrasion of taps. When a tap is abraded, a screw hole becomes defective because the screw hole becomes lower than the minimum allowable dimension of the effective diameter or the effective length of the screw part becomes shorter than the allowable dimension. However, only the simple performance of the automatic inspection cannot grasp such a condition.

In many cases, phase matching of a thread is not considered when a gauge is inserted into a screw hole. Thus, a fastening error that is engagement between a gauge and a screw hole may occur. The technique disclosed in Japanese Patent Laid-Open No. 02-224934 or the like may solve this problem but a floating mechanism or the like is required, thereby also causing a problem with respect to cost.

In automatic inspection, the automatic inspection is controlled by executing an inspection program on a numerical control device that controls a said automatic inspection device. However, the inspection program needs to be prepared separately from a machining program. This increases the labor of a worker.

SUMMARY OF THE INVENTION

An object of the present invention is to provide a numerical control device that can perform automatic inspection of a screw hole with a machine that has machined the screw hole without preparing dedicated hardware.

A numerical control device according to the present invention is a numerical control device controlling a feed-axis motor and a main-axis motor that drive a main axis of a machining tool that performs screw-hole machining on a workpiece based on a machining program. A screw-hole inspection gauge is attachable to the main axis of the machining tool. The numerical control device includes a control unit that performs control in such a way that the feed-axis motor and the main-axis motor that drive the main axis with the screw-hole inspection gauge attached thereto perform a screw-hole inspection operation based on the machining program and a determining unit that determines acceptance/defect of inspection of a screw hole machined on the workpiece based on a condition of the feed-axis motor or a condition of the main-axis motor during control by the control unit.

In some embodiments, the screw-hole inspection gauge is a tool for Go side determination, and the inspection of the screw hole machined on the workpiece is Go side determination inspection.

In some embodiments, the screw-hole inspection gauge is a tool for No Go side determination, and the inspection of the screw hole machined on the workpiece is No Go side determination inspection.

In some embodiments, the screw-hole inspection gauge is a tool for main-axis torque cumulation determination, and the inspection of the screw hole machined on the workpiece is main-axis torque cumulation determination inspection.

In some embodiments, at least one of a torque lower limit and a torque upper limit for a warning of the main-axis motor is set in advance, and the determining unit performs warning display when a torque value of the main axis motor fails to satisfy at least one of the torque lower limit and the torque upper limit for a warning.

In some embodiments, at least one of a main-axis torque cumulation lower limit and a main-axis torque cumulation upper limit for a warning of the main-axis motor is set in advance, and the determining unit performs warning display when a main-axis torque cumulative value of the main axis motor fails to satisfy at least one of the main-axis torque cumulation lower limit and the main-axis torque cumulation upper limit for a warning.

In some embodiments, the numerical control device further includes a soft floating setting unit that lowers a torque limit of the feed-axis motor and a torque limit of the main-axis motor before the screw-hole inspection gauge is inserted into the screw hole machined on the workpiece, and makes a limit of a positional deviation amount of the feed-axis motor changeable temporarily, and in insertion of the screw-hole inspection gauge into the screw hole machined on the workpiece, the control unit drives the feed-axis motor in a direction that the screw-hole inspection gauge is inserted into the screw hole, and when the positional deviation amount of the feed-axis motor exceeds the limit of the positional deviation amount of the feed-axis motor, the control unit temporarily stops the feed-axis motor, rotates the main-axis motor in a screw-in direction, and re-drives the feed-axis motor at a time point at which the positional deviation of the feed-axis motor is eliminated.

In some embodiments, the numerical control device operates in at least two modes that are a normal mode in which machining control is performed on a workpiece based on a machining program and a screw-hole inspection mode in which operation control for screw-hole inspection is performed based on a machining program, and when the numerical control device operates in the screw-hole inspection mode, the control unit performs control in such a way that the feed-axis motor and the main-axis motor perform an operation for screw-hole inspection based on the machining program.

In some embodiments, the numerical control device is switched to the screw-hole inspection mode by a signal or a G code.

According to the present invention, automatic inspection of a screw hole can be performed by a machining tool that has machined the screw hole without preparing a dedicated automatic inspection device. Immediately after the screw hole is machined by the machining tool, in-device inspection can be performed directly. Therefore, the occurrence of many defects in mass-produced parts can be prevented.

In determination of defects by main-axis torque cumulation, screw parts that are cheaper than gauges can be used for the inspection. Accordingly, when a defective product is going to be produced, a warning is given in advance to prevent a defect from being generated. Furthermore, a machining program can be used as it is as a program for the automatic inspection. This can eliminate the labor for preparing a program dedicated for the automatic inspection.

BRIEF DESCRIPTION OF THE DRAWINGS

The above and other objects and features of the present invention will become apparent from embodiments that are described below with reference to the accompanying drawings, wherein:

FIG. 4A is an explanatory diagram of main-axis torque cumulation determination inspection by a numerical control device in an embodiment of the present invention and shows measurement of main-axis torque cumulation and setting of an allowable range for an acceptable product;

FIG. 4B is an explanatory diagram of main-axis torque cumulation determination inspection by the numerical control device in the embodiment of the present invention and shows a case where determination is performed by comparing main-axis torque cumulation at inspection with that of an acceptable product;

FIG. 5A is an explanatory diagram of warning processing by a numerical control device in an embodiment of the present invention and shows a case where torque of a main axis is higher than Thigh;

FIG. 5B is an explanatory diagram of warning processing by the numerical control device in the embodiment of the present invention and shows a case where a warning is not given to the torque of the main axis but the torque of the main axis is higher than Shigh;

FIG. 7 is an explanatory diagram of control of inspection operations based on a machining program by a numerical control device in an embodiment of the present invention;

FIG. 8A is an explanatory diagram of an inspection-operation instructing method to a numerical control device in an embodiment of the present invention and shows change to a screw-hole inspection mode by a G code;

FIG. 8B is an explanatory diagram of the inspection-operation instructing method to the numerical control device in the embodiment of the present invention and shows screw-hole inspection operations by a G code;

FIG. 9A is an explanatory diagram of Go side inspection and No Go side inspection of a screw hole; and FIG. 9B is an explanatory diagram of Go side inspection and No Go side inspection of a screw hole.

DETAILED DESCRIPTION OF THE REFERRED EMBODIMENTS

In the present invention, instead of preparing a dedicated automatic inspection device, determination of defects is performed by attaching a screw limit gauge to a main axis of a machining tool that is capable of machining screw holes and monitoring the torque of a motor during the insertion of the screw limit gauge into a screw hole. In this determination of defects, when a screw hole that is determined not to be defective but to be barely acceptable is detected, a warning is given.

In the present invention, to prevent the collapse of a thread, torque limits of the main axis and the motor that is in a thrust direction are temporarily lowered before the gauge is inserted into a screw hole. Also, adjustment for changing the limit of the positional deviation amount in the thrust direction to a value as large as the size of the screw pitch is automatically performed.

There is provided a configuration for diverting an NC program that has been used for control of tap machining as it is as an inspection program for operation control of insertion of the screw limit gauge into a screw hole.

Hereinafter, embodiments of the present invention will be described with reference to the drawings.

Figure 1:
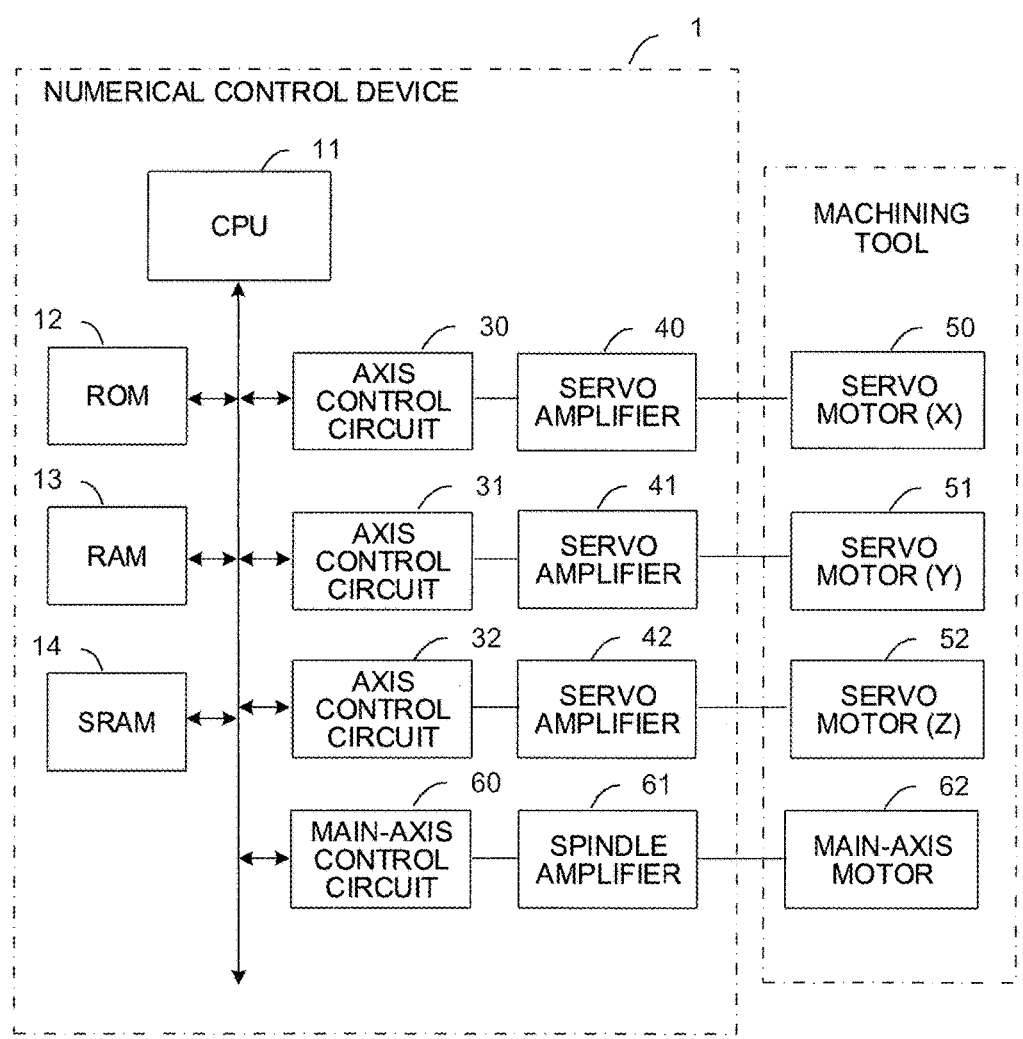
FIG. 1 is a block diagram of main parts of a numerical control device and a machining tool in an embodiment of the present invention.

FIG. 1 is a block diagram of main parts of a numerical control device and a machining tool in an embodiment of the present invention. A processor (CPU) 11 is a processor that controls a numerical control device 1 entirely. The processor (CPU) 11 reads out a system program stored in a ROM 12 and controls the numerical control device 1 entirely in accordance with the system program.

System programs stored in the ROM 12 include various programs that are necessary for processing in an editing mode required for preparation and editing of machining programs and operation modes of the numerical control device 1 such as an actual machining mode and an inspection mode.

Temporary calculation data or various data that are input by an operator via a LCD/MDI unit (not shown) are stored in a RAM 13.

An SRAM 14 is backed up with a battery (not shown) to function as a non-volatile memory. A machining program read out from an external device (not shown), a machining program input via an LCD/MDI unit (not shown), and the like are stored in the SRAM 14. Settings of association between machining tools and inspection tools (described later) and various setting values such as maximum allowable torque used in an inspection mode are also stored in the SRAM 14.

Axis control circuits 30, 31, and 32 receive instructions for moving respective axes from the processor (CPU) 11 and output the instructions to servo amplifiers 40, 41, and 42, respectively. In response to these instructions, the servo amplifiers 40, 41, and 42 drive servo motors 50, 51, and 52 for respective axes of the machining tool, respectively. The numerical control device 1 is provided with a mechanism that detects the rotation speed, torque, positional deviation amount, and the like of each servo motor. In the present embodiment, the servo motors 50, 51, and 52 are used for driving linear moving axes X and Y that are used for positioning and a Z axis that is a feeding axis of a main axis, respectively.

A main-axis control circuit 60 outputs a spindle speed instruction to a spindle amplifier 61 in response to a main-axis rotation instruction from the processor (CPU) 11 to a machining tool 2. The spindle amplifier 61 causes a main-axis motor 62 to rotate at a cutting rotation speed according to the instruction to the machining tool in response to the spindle speed instruction. The numerical control device 1 is further provided with a mechanism that detects the rotation speed and torque of each servo motor.

The machining tool 2 includes a structure that allows replacement of a tool to be attached to the main axis. A tool may be replaced manually, or may be replaced automatically under control by the numerical control device by providing an automatic tool replacing device or the like. To attach a gauge or a screw for inspection to the main axis, after a tool holder is caused to hold the gauge or the screw to be attached by hand in advance, the tool holder is attached to the main axis. Thereby, the gauge or the screw can be easily attached to the main axis.

Descriptions will be given of a method of performing screw-hole inspection in the numerical control device 1 and the machining tool 2 having the above configuration.

<1. Method of Determining Acceptance/Defect>

In the present invention, a screw limit gauge is attached to a main axis of a machining tool that is capable of machining screw holes, and the torque of a motor during insertion into a screw hole is monitored so that determination of defects is performed. The screw limit gauge may be attached to the main axis manually by an operator, or may be attached to the main axis automatically with an automatic tool replacement device or the like.

Hereinafter, descriptions will be given of three kinds of determination methods of acceptance/defect, i.e., Go side determination, No Go side determination, and main-axis torque cumulation determination.

<1-1. Go Side Determination>

The numerical control device 1 in an embodiment of the present invention controls the machining tool 2 having a Go-side screw limit gauge attached thereto to perform Go side determination of acceptance/defect of a screw hole. In the numerical control device 1 of the present embodiment, the maximum allowable torques Tmax-sp and Tmax-sv are set in advance as respective thresholds for the main-axis motor 62 and the feed-axis motor 52 that is in the thrust direction, respectively, prior to the Go side determination of acceptance/defect of the screw hole.

Figure 2A:
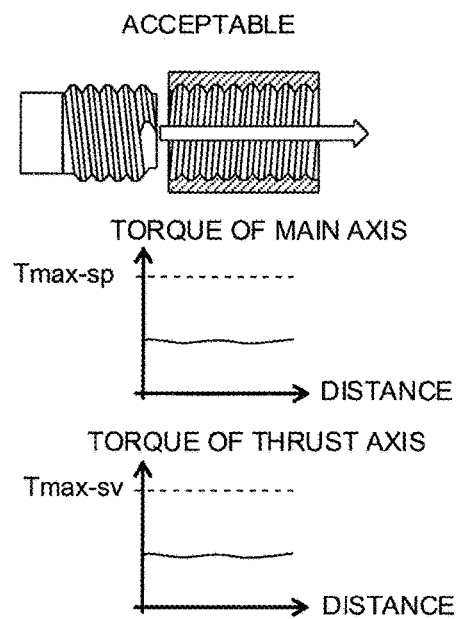
FIG. 2A is an explanatory diagram of Go side determination inspection by a numerical control device in an embodiment of the present invention and shows an example of acceptance.

The numerical control device 1 of the present embodiment controls the machining tool 2 by executing a machining program that has been used for machining a screw hole by a method (described later) in an inspection mode, and inserts the Go gauge attached to the main axis into the screw hole machined on a workpiece. If the Go gauge moves by a specified distance while the torque of the main-axis motor 62 and the torque of the feed-axis motor 52 do not exceed the maximum allowable torques Tmax-sp and Tmax-sv, respectively, as shown in FIG. 2A, it is determined that the screw hole is acceptable and a message for that is displayed on a display unit of the numerical control device 1.

Figure 2B:
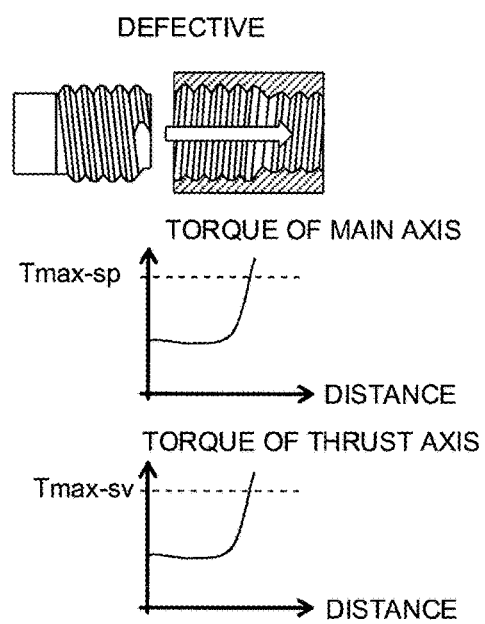
FIG. 2B is an explanatory diagram of Go side determination inspection by the numerical control device in the embodiment of the present invention and shows an example of a defect.

In contrast, if the torque of the main-axis motor 62 exceeds the threshold Tmax-sp on the way of the insertion as shown in FIG. 2B, it is determined that the screw hole is defective because the minimum allowable dimension of an effective diameter is not satisfied. If the torque of the feed-axis motor 52 that is in the thrust direction exceeds the maximum allowable torque Tmax-sv, it is determined that the screw hole is defective because an effective length is not satisfied. In any case, the reason why the screw hole is determined to be defective, along with the torque value, the coordinate value or the like, is displayed on the display unit of the numerical control device 1.

<1-2. No go Side Determination>

The numerical control device 1 in an embodiment of the present invention controls the machining tool 2 having a No Go-side screw limit gauge attached thereto to perform No Go side determination of acceptance/defect of a screw hole. In the numerical control device 1 of the present embodiment, the maximum allowable torque Tmax-sp is set in advance for the main-axis motor 62, as in the Go side determination, and further, a maximum rotation speed Rmax for the main-axis motor 62 is set, prior to the No Go side determination of acceptance/defect of a screw hole.

Figure 3A:
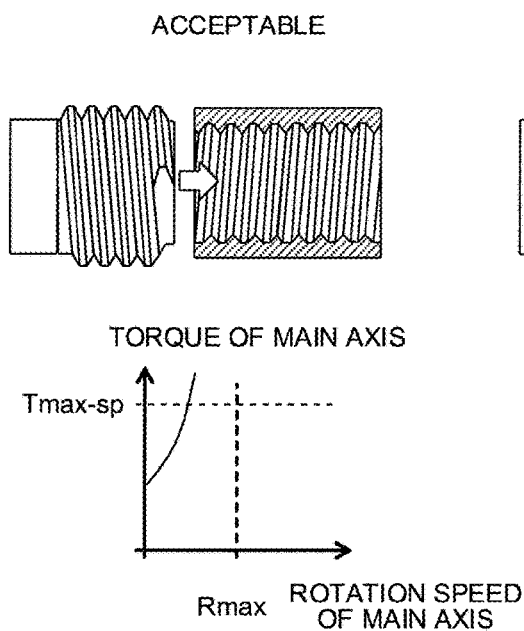
FIG. 3A is an explanatory diagram of No Go side determination inspection by a numerical control device in an embodiment of the present invention and shows an example of acceptance.

The numerical control device 1 in the present embodiment controls the machining tool 2 by executing a machining program that has been used for machining a screw hole by a method (described later) in an inspection mode, and inserts the No Go gauge attached to the main axis into the screw hole machined on a workpiece. If the torque of the main-axis motor 62 exceeds the threshold Tmax-sp before the rotation speed of the main-axis motor 62 reaches the maximum rotation speed Rmax, as shown in FIG. 3A, it is determined that the screw hole is acceptable and a message for that is displayed on the display unit of the numerical control device 1.

Figure 3B:
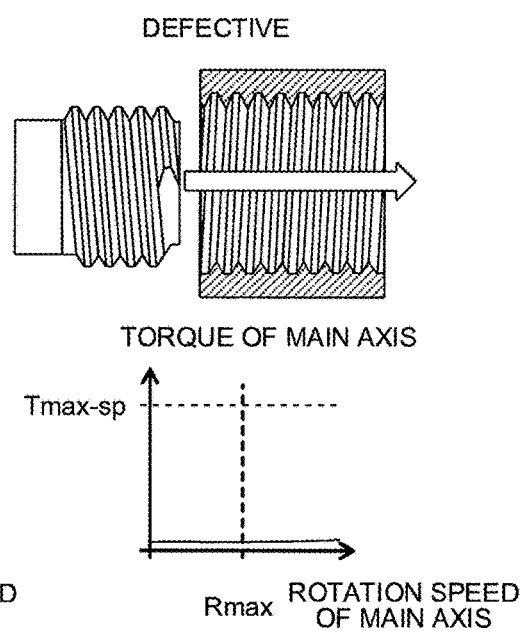
FIG. 3B is an explanatory diagram of No Go side determination inspection by the numerical control device in the embodiment of the present invention and shows an example of a defect.

In contrast, if the torque of the main-axis motor 62 does not exceed Tmax-sp before the rotation speed of the main-axis motor 62 reaches the maximum rotation speed Rmax, as shown in FIG. 3B, it is determined that the screw hole is defective because the minimum allowable dimension of the effective diameter is not satisfied. The reason why the screw hole is determined to be defective, along with the torque value, the coordinate value or the like, is displayed on the display unit of the numerical control device 1.

<1-3. Main-Axis Torque Cumulative Value Determination>

The numerical control device 1 in an embodiment of the present invention has a function of performing determination of acceptance/defect by a main-axis torque cumulative value. In the numerical control device 1 of the present embodiment, a cumulative value (an integrated value) of the torque of the main-axis motor 62 during insertion of a Go gauge into a screw hole the acceptance of which has been confirmed is recorded and an upper limit and a lower limit of the allowable range are set based on the cumulative value, prior to the present determination, as shown in FIG. 4A.

The numerical control device 1 of the present embodiment controls the machining tool 2 by executing a machining program that has been used for machining a screw hole by a method (described later) in an inspection mode, inserts the Go gauge attached to the main axis into the screw hole machined on a workpiece, and measures the cumulative value of the torque of the main-axis motor 62 during the insertion, as shown in FIG. 4B. If the measured cumulative value is within an allowable range, it is determined that the screw hole is acceptable and a message for that is displayed on the display unit of the numerical control device 1.

In contrast, if the measured cumulative value is outside the allowable range, it is determined that the screw hole is defective and the reason why the screw hole is determined to be defective, along with the cumulative value or the like, is displayed on the display unit of the numerical control device 1. If the torque of the main-axis motor 62 or the torque of the feed-axis motor 52 in the thrust direction exceeds the threshold in the present determination, as in the Go side determination, it is determined at that time point that the screw hole is defective. The reason why the screw hole is determined to be defective, along with the torque value, the coordinate value, or the like, is displayed on the display unit of the numerical control device 1.

The determination by a main-axis torque cumulative value may be performed using a gauge dedicated for main-axis torque cumulation determination that has a thickness equal to or more than a tool used for the Go side determination but a little thinner than a tool used for the No Go side determination, instead of using the Go gauge as described above. Unlike in the Go side determination or the No Go side determination, acceptance/defect is determined according to relative comparison with an acceptable value. Accordingly, in order to perform the present determination only, inspection may be performed using not a dedicated Go gauge but a simple screw.

<2. Prevention of Defects by Warning Function>

The numerical control device 1 in an embodiment of the present invention has a function of outputting a warning for a screw hole when the screw hole is determined not to be defective but to be barely accepted as a result of the determination of acceptance/defect of the screw hole. In the numerical control device 1 in the present embodiment, a lower limit $T_{low}$ and an upper limit $T_{high}$ of the warning torque are set for the torque of the main axis prior to Go side determination. Similarly, a lower limit $S_{low}$ and an upper limit $S_{high}$ of the main-axis cumulative value are set. In some embodiments, only one of the lower limit and the upper limit can be set.

In performing the Go side determination, if the torque of the main-axis motor 62 is lower than the lower limit $T_{low}$ as shown in FIG. 5A, the numerical control device 1 of the present embodiment determines that the screw hole has a part that is very close to the maximum allowable dimension of the effective diameter and is a warning target. If the torque of the main-axis motor 62 is higher than the upper limit $T_{high}$, the numerical control device 1 determines that the screw hole has a part that is very close to the minimum allowable dimension of the effective diameter and is a warning target. When it is determined that the screw hole is a warning target, even if the screw hole is accepted in the Go side determination, the reason for the warning, along with the torque value or the like, is displayed on the display unit of the numerical control device 1.

If the torque cumulative value of the main-axis motor 62 is lower than the lower limit $S_{low}$ as shown in FIG. 5B, the numerical control device 1 determines that the entire screw hole is very close to the maximum allowable dimension of the effective diameter and is a warning target. If the torque cumulative value of the main-axis motor 62 is higher than the upper limit $S_{high}$, the numerical control device 1 determines that the entire screw hole is very close to the minimum allowable dimension of the effective diameter and is a warning target. When it is determined that the screw hole is a warning target, even if the screw hole is accepted in the Go side determination, the reason for the warning, along with the torque cumulative value or the like, is displayed on the display unit of the numerical control device 1.

<3. Insertion into Screw Hole by Soft Floating>

Figure 6A:
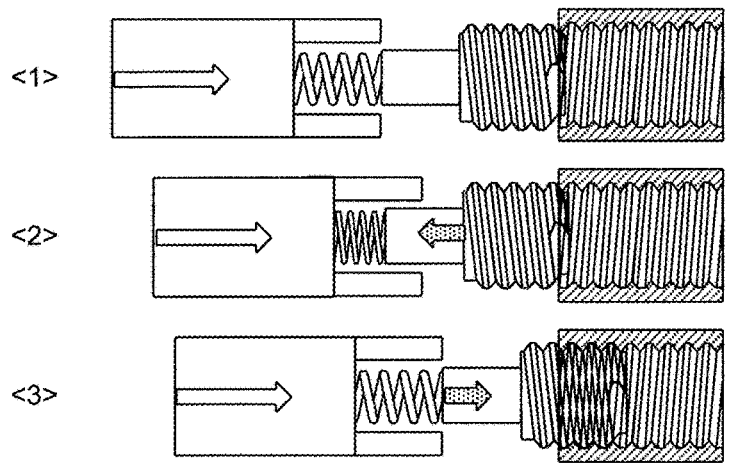
FIG. 6A is an explanatory diagram of a floating technique by a hardware configuration by an existing numerical control device.

In performing the above determination methods for inspection of a screw hole, a screw hole needs to be prevented from collapsing due to a fastening error that is engagement between the gauge and the screw hole. In a conventional technique, as shown in FIG. 6A, this problem has been solved by providing a floating mechanism. In the floating mechanism, pressing means such as a spring is placed at the root of a gauge (FIG. 6A <1>), the gauge is reverse-driven while being pressed against a screw hole and the screwed position between the gauge and the screw hole is detected (FIG. 6A <2>), and the gauge is forward-driven at the point at which the screwed position is detected, thereby avoiding the engagement between the gauge and the screw hole.

Figure 6B:
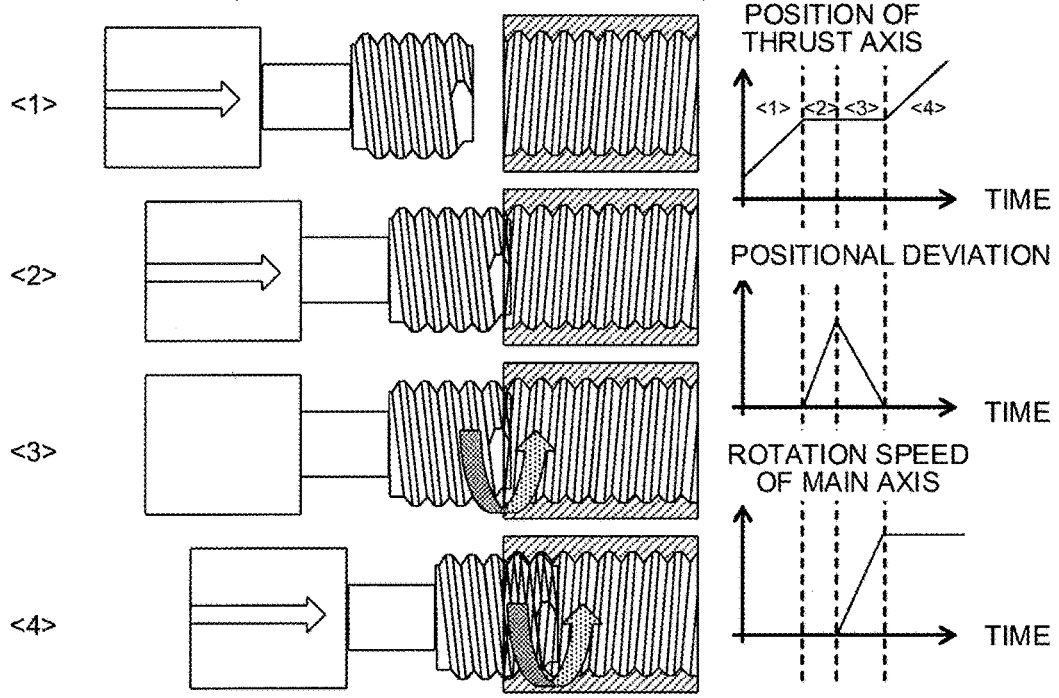
FIG. 6B is an explanatory diagram of a soft floating technique by a numerical control device in an embodiment of the present invention.

In contrast, in the numerical control device 1 in an embodiment of the present invention, as shown in FIG. 6B, the above problem is solved by a soft floating method. In the soft floating method, before a gauge is inserted into a screw hole, the torque limits of the main-axis motor 62 and the feed-axis motor 52 that is in the thrust direction are temporarily lowered in advance. The limit of the positional deviation amount of the feed-axis motor 52 in the thrust direction is also changed to a value as large as the pitch of the screw. The above changes are performed automatically by the numerical control device 1 when the numerical control device 1 enters an inspection mode.

Next, the feed-axis motor 52 is driven without rotating the main axis to start inserting the gauge into the screw hole (FIG. 6B <1>). When the threads of the gauge and the screw hole collide with each other and the positional deviational amount of the feed-axis motor 52 that is in the thrust direction exceeds the limit that is set in advance (FIG. 6B <2>), the feed-axis motor 52 that is in the thrust direction is stopped and the main-axis motor 62 is rotated in the screw-in direction (FIG. 6B <3>). At a time point at which the positional deviation is eliminated by the revolutions of the main axis, the feed-axis motor 52 that is in the thrust direction is re-driven (FIG. 6B <4>). The above control enables inspection in which excessive loads are not applied to the threads without providing a special hardware configuration for floating.

<4. Preparation of Inspection Program>

In the numerical control device 1 in an embodiment of the present invention, a machining program that has been used for tap machining can be utilized as it is in the inspection of a screw hole as an inspection program.

In the numerical control device 1 of the present embodiment, the number of a tap tool and the tool numbers of gauges for inspecting a hole machined by the tap tool are associated with each other and registered in advance in a setting region on a memory. There are three types of inspection tools, i.e., a tool for main-axis torque cumulation determination, a tool for Go side determination, and a tool for No Go side determination. These tools are used for respective inspection modes.

To inspect a screw hole, while a machined workpiece is placed on a workbench, the numerical control device 1 is shifted to an inspection mode by a signal, a G code (Gxx), or the like, and a machining program that has been used for the machining is executed.

The numerical control device 1 of the present embodiment shifted to the inspection mode sequentially reads out the machining program the execution of which is dictated and skips blocks to a point of an instruction for replacement with a tap tool. When the numerical control device 1 reads out the instruction for replacement with a tap tool from the machining program, the numerical control device 1 checks whether an inspection tool is registered in association with the tap tool with reference to the setting region on the memory. When the inspection tool is registered in association with the tap tool, the instruction for replacement with the tap tool is executed, the tool is replaced with the inspection tool, positioning of the inspection tool is performed, and the tap cycle after the positioning is performed as inspection operations.

FIG. 7 is a diagram showing control operations in actual machining and in a screw-hole inspection mode on the numerical control device 1 of the present embodiment. When the machining program that is shown in the left column in FIG. 7 is executed in a normal mode, tools are sequentially replaced manually or automatically in accordance with a tool replacement instruction (M06) and the numerical control device 1 controls the machining tool 2 to perform rough machining, preparative hole machining, chamfering machining, and tap machining with the respective replaced tools.

After the machining is completed, the mode is switched to a screw-hole inspection mode and the identical machining program is executed. Accordingly, for each tool replacement instruction, the numerical control device 1 refers to the setting region on the memory and checks whether the association between the tap machining tool and the inspection tools is set. In the case in FIG. 7, since association between machining tools and inspection tools is not set for tools T01, T02, and T03, all tool replacement instructions and machining instructions after tool replacement are skipped.

When a tool replacement instruction for replacement with the tool number T04 is read, it is confirmed that the association of the tap machining tool T04 with inspection tools T14, T15, and T16 is set with reference to the setting region on the memory. The numerical control device 1 issues an instruction for replacement with a tool corresponding to a current inspection mode (the main-axis torque cumulation determination inspection mode, the Go side determination inspection mode, or the No Go side determination inspection mode). After the tool replacement, positioning to a position dictated by the machining program is performed and an inspection operation cycle is performed in replace of the tap machining cycle.

In the inspection operation cycle, positioning of inspection tools in the inspection and the distance to the hole bottom are controlled based on the distance from the position dictated in the tap machining cycle to the hole bottom. Even when the length of the tap machining tool differs from that of the inspection tool, control in a depth direction is corrected as appropriate based on the tool length that is set for each tool.

The example for controlling the inspection tools by using the machining instruction as it is in the inspection mode has been described above. However, in some embodiments, a G code (Gyy) dedicated for inspection is separately prepared and instructions of inspection operations are issued in such a way that the inspection operations are explicitly distinguished from the tap machining.

FIG. 8A is an example in which screw-hole inspection is performed by changing a screw-hole inspection mode with a G code "Gxx" in the numerical control device 1 of the present embodiment. To perform inspection, a worker causes the numerical control device 1 to execute a program for calling a machining program O0001, as shown in FIG. 8A, after the shift to the screw-hole inspection mode.

In the numerical control device 1 of the present embodiment, as shown in FIG. 8B, screw-hole inspection may be explicitly performed by preparing an inspection program directly. In this case, it is possible to handle a situation in which the machining program that has been used for machining cannot be prepared.

Embodiments of the present invention have been described above. However, the present invention is not limited to the above described embodiments and can be performed in various embodiments by adding an appropriate modification.

The invention claimed is:

1. A numerical control device controlling a feed-axis motor and a main-axis motor that drive a main axis of a machining tool that performs screw-hole machining on a workpiece based on a machining program, wherein
    a screw-hole inspection gauge is attachable to the main axis of the machining tool, and
    the numerical control device comprises:
    a control unit that performs control in such a way that the feed-axis motor and the main-axis motor that drive the main axis with the screw hole inspection gauge attached thereto perform a screw-hole inspection operation based on the machining program; and
    a determining unit that determines acceptance/defect of inspection of a screw hole machined on the workpiece based on a condition of the feed-axis motor or a condition of the main-axis motor during control by the control unit, further comprising
    a soft floating setting unit that lowers a torque limit of the feed-axis motor and a torque limit of the main-axis motor before the screw-hole inspection gauge is inserted into the screw hole machined on the workpiece, and makes a limit of a positional deviation amount of the feed-axis motor changeable temporarily, wherein
    in insertion of the screw-hole inspection gauge into the screw hole machined on the workpiece, the control unit drives the feed-axis motor in a direction that the screw-hole inspection gauge is inserted into the screw hole, and when the positional deviation amount of the feed-axis motor exceeds the limit of the positional deviation amount of the feed-axis motor, the control unit temporarily stops the feed-axis motor, rotates the main-axis motor in a screw-in direction, and re-drives the feed-axis motor at a time point at which the positional deviation of the feed-axis motor is eliminated.

2. The numerical control device according to claim 1, wherein the screw-hole inspection gauge is a tool for Go side determination, and the inspection of the screw hole machined on the workpiece is Go side determination inspection.

3. The numerical control device according to claim 2, wherein
at least one of a torque lower limit and a torque upper limit for a warning of the main-axis motor is set in advance, and
the determining unit performs warning display when a torque value of the main axis motor fails to satisfy at least one of the torque lower limit and the torque upper limit for a warning.

4. The numerical control device according to claim 1, wherein the screw-hole inspection gauge is a tool for No Go side determination, and the inspection of the screw hole machined on the workpiece is No Go side determination inspection.

5. The numerical control device according to claim 1, wherein the screw-hole inspection gauge is a tool for main-axis torque cumulation determination, and the inspection of the screw hole machined on the workpiece is main-axis torque cumulation determination inspection.

6. The numerical control device according to claim 5, wherein at least one of a main-axis torque cumulation lower limit and a main-axis torque cumulation upper limit for a warning of the main-axis motor is set in advance, and
the determining unit performs warning display when a torque cumulation value of the main axis of the main-axis motor fails to satisfy at least one of the main-axis torque cumulation lower limit and the main-axis torque cumulation upper limit for a warning.

7. The numerical control device according to claim 1, wherein
at least one of a torque lower limit and a torque upper limit for a warning of the main-axis motor is set in advance, and
the determining unit performs warning display when a torque value of the main axis motor fails to satisfy at least one of the torque lower limit and the torque upper limit for a warning.

8. The numerical control device according to claim 1, wherein at least one of a main-axis torque cumulation lower limit and a main-axis torque cumulation upper limit for a warning of the main-axis motor is set in advance, and
the determining unit performs warning display when a torque cumulation value of the main axis of the main-axis motor fails to satisfy at least one of the main-axis torque cumulation lower limit and the main-axis torque cumulation upper limit for a warning.

9. The numerical control device according to claim 1, wherein the numerical control device operates in at least two modes that are a normal mode in which machining control is performed on a workpiece based on a machining program and a screw-hole inspection mode in which operation control for screw-hole inspection is performed based on a machining program, and
the control unit, when the numerical control device operates in the screw-hole inspection mode, performs control in such a way that the feed-axis motor and the main-axis motor perform an operation for screw-hole inspection based on the machining program.

10. The numerical control device according to claim 9, wherein
the numerical control device is switched to the screw-hole inspection mode by a signal or a G code.

11. A numerical control device controlling a feed-axis motor and a main-axis motor that drive a main axis of a machining tool that performs screw-hole machining on a workpiece based on a machining program, wherein
a screw-hole inspection gauge is attachable to the main axis of the machining tool, and
the numerical control device comprises:
a control unit that performs control in such a way that the feed-axis motor and the main-axis motor that drive the main axis with the screw hole inspection gauge attached thereto perform a screw-hole inspection operation based on the machining program; and
a determining unit that determines acceptance/defect of inspection of a screw hole machined on the workpiece based on a condition of the feed-axis motor or a condition of the main-axis motor during control by the control unit,
wherein the screw-hole inspection gauge is a tool for main-axis torque cumulation determination, and the inspection of the screw hole machined on the workpiece is main-axis torque cumulation determination inspection.

12. The numerical control device according to claim 11, wherein at least one of a main-axis torque cumulation lower limit and a main-axis torque cumulation upper limit for a warning of the main-axis motor is set in advance, and
the determining unit performs warning display when a torque cumulation value of the main axis of the main-axis motor fails to satisfy at least one of the main-axis torque cumulation lower limit and the main-axis torque cumulation upper limit for a warning.

* * * * *